Figure 1:
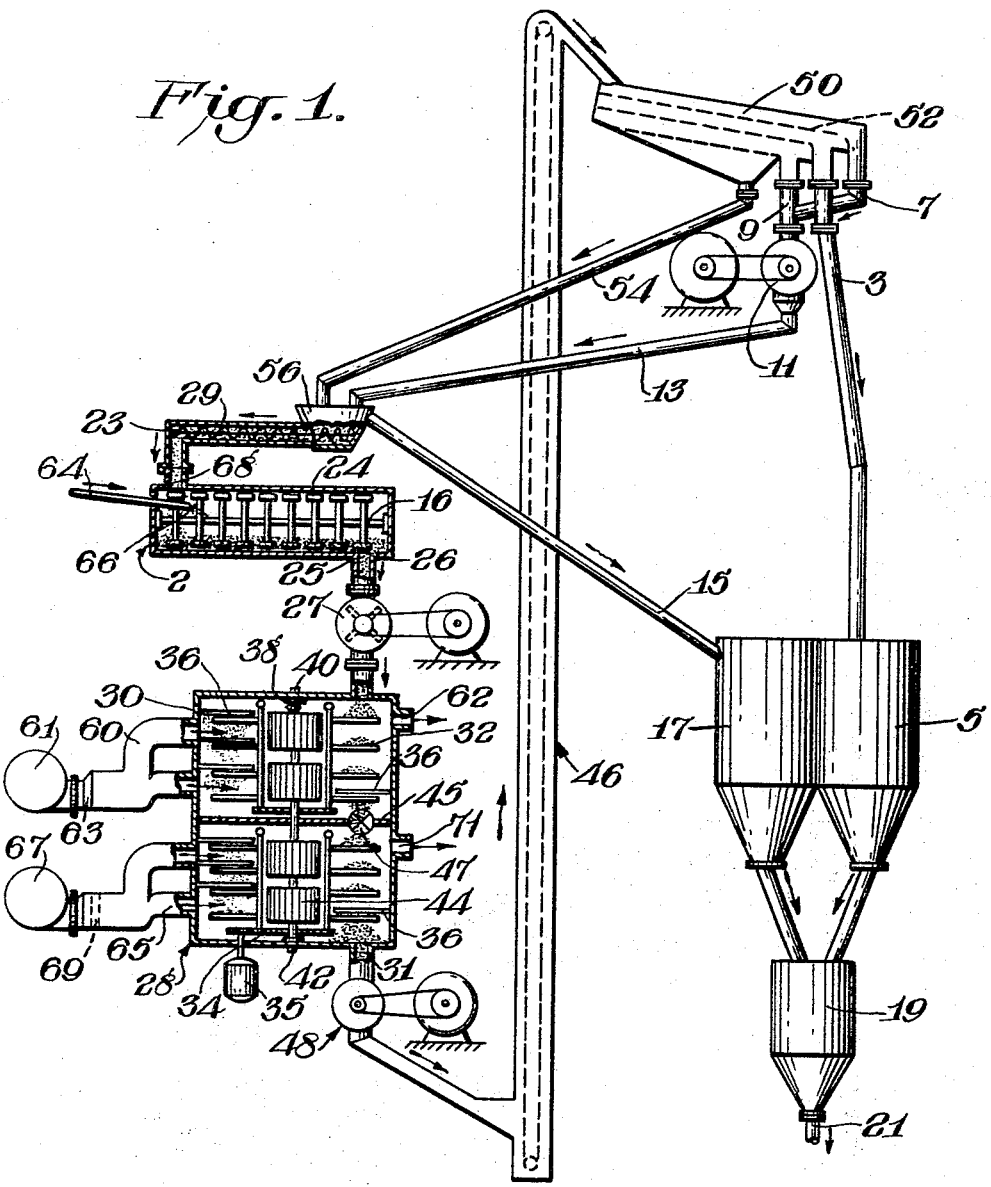

July 11, 1967  R. F. SHANNON  3,330,874
SORBITOL CRYSTALLIZATION PROCESS
Filed Jan. 31, 1963

INVENTOR
Robert F. Shannon
BY Connolly and Hutz
ATTORNEYS

# United States Patent Office 3,330,874
Patented July 11, 1967

3,330,874
SORBITOL CRYSTALLIZATION PROCESS
Robert F. Shannon, Waterford, Conn., assignor to Chas. Pfizer & Co., Inc., New York, N.Y., a corporation of Delaware
Filed Jan. 31, 1963, Ser. No. 255,240
8 Claims. (Cl. 260—637)

This invention relates to a crystallization process and, more particularly to a process for obtaining substantially anhydrous, crystalline sorbitol.

Sorbitol is a polyhydric alcohol having a number of uses. It is, for example, employed in the manufacture of ascorbic acid and propylene glycol and for the preparation of synthetic plasticizers and resins. A new and important use for sorbitol is the subject of the copending patent application of Herbert Thompson, Jr., Ser. No. 197,863, filed May 28, 1962, now Patent No. 3,200,039 and assigned to the assignee of the instant application. As is disclosed and claimed therein, sorbitol may be employed as the binder in the preparation of pharmaceutical-containing tablets and troches, and these possess very desirable slow-dissolving properties in the mouth.

Sorbitol is manufactured industrially by the catalytic hydrogenation of solutions of glucose in water. After the catalyst is removed, the reaction mixture containing sorbitol is usually concentrated to a thick syrup containing about 30% of water and such syrups are then sold in commerce, serving as basic starting materials for most of the end uses of sorbitol. However, to prepare the aforementioned sorbitol-containing tablets and troches for drug use, it is very convenient to use sorbitol in a crystalline form. The sorbitol in this form may be mixed with the desired pharmaceutical ingredients; the dry mixture is fed to a tabletting machine wherein it is compressed and formed into tablets or troches at very high rates of production.

Substantially anhydrous, crystalline sorbitol may be produced by evaporating the water from the aforesaid commercially-available water-containing sorbitol solutions. However, simply removing the water in this way leaves the sorbitol in a clear, glassy amorphous state and crystallization from this state is extremely slow, requiring a matter of days. After solidification is complete the product finally must be broken up and pulverized. A number of ways have been proposed to provide crystalline sorbitol more economically. Among these might be mentioned, for example, the process of U.S. Patent 2,315,699 which relates to "seeding" a highly concentrated, super-saturated sorbitol solution with sorbitol crystals, thereby promoting rapid crystallization, allowing the crystallization to proceed until it is substantially complete and then filtering the uncrystallized portion off or, alternatively, washing it free of mother liquor with an organic solvent. Thus, the process of the said patent requires several steps to provide that the crystalline sorbitol be freed from the mother liquor, which must be discarded.

U.S. Patent 2,594,863 discloses still another process for the preparation of substantially anhydrous, crystalline sorbitol, and the expensive and time-consuming features of the first mentioned patent are largely obviated by crystallizing molten sorbitol in thin layers on the surface of pre-formed pellets of crystalline sorbitol. It is recited to be critical to the process of the said second patent that the rate of addition of molten sorbitol must be so slow that matrix formation is precluded. When this is done, each of the said pre-formed pellets becomes the center of a thin envelope of crystallizing sorbitol.

As is disclosed, and claimed, in the said patent U.S. 2,594,863, it is critical to the process that matrix formation not be allowed to occur during the crystallization process. It has long been believed in the art that, if matrix formation does occur, crystallization of the sorbitol will be inhibited possibly because the high viscosity of the medium will slow down the growth of the crystals. Furthermore, the final crystals may contain areas of glassy material, which are not desirable, because of a hygroscopic characteristic. Accordingly, to prevent matrix formation, it has been thought necessary to charge a relatively high portion of solid sorbitol in the form of large pellets, using for example at least about 10 and, more usually, about 20 parts by weight of pellets per part of molten sorbitol. Furthermore, it has been thought necessary to thoroughly agitate and rub the pellets, moving them slowly forward through a mixing zone and adding sorbitol to said mixing so slowly that not enough liquid is present at any one time or place to form a matrix. This slow rate of addition of molten sorbitol combined with the recycling of 10 or even 20 parts of the solid per part of sorbitol crystallized in the mixing zone effectively prevents the formation of a matrix but has the disadvantage of requiring substantial expense in building plants large enough to produce even several million pounds of crystals per year.

It has now been found possible to obtain more economically a product fully as satisfactory as that disclosed in the said Patent No. 2,594,836. Thus, the ratio of solid to melt may be reduced down to levels of the order of 2 to 3 and even to as low as 1.3 parts of crystalline feed per part of melt, while allowing a matrix to form and while the matrix is maintained in a particulate state until crystallization is substantially complete. Furthermore, in view of the art, crystallization occurs with surprising rapidity in the matrix. While the reason for rapid crystallization in the matrix is not clear at this time, it is believed that carrying the process out under critical conditions of temperature and agitation provides for intimate contact of the melt with relatively large "seeding" area per unit weight of recycled sorbitol and thus precludes the formation of a "glass" within the matrix; without glass formation crystallization is extremely rapid. This discovery provides for a substantially higher rate of throughput in equipment of the same general size as used heretofore or provides for an equivalent rate of throughput in a substantially smaller plant.

It is accordingly a principal objective of the instant invention to provide a method for the preparation of substantially anhydrous crystalline sorbitol.

It is a further object of the instant invention to provide crystalline sorbitol in such a manner that equipment costs are minimized and process costs are lowered by reason of increased rates of throughput.

These and other objects are readily accomplished by the practice of the process of the instant invention which is, in essence: A process for producing particulate sorbitol which comprises agitating molten sorbitol containing up to about 5% moisture with at least about 1.3 parts by weight of granular sorbitol at a temperature from about 45° C. to about 95° C., said temperature and said agitation being so adjusted that said granular sorbitol remains solid, continuing said agitation until a particulate matrix of said granules in said molten sorbitol forms and cooling and agitating said particulate matrix until said molten sorbitol crystallizes.

The molten sorbitol may be obtained by concentration of water-containing sorbitol solutions either by batchwise or, preferably, by continuous-type evaporation until the water content is reduced to below about 5%.

The ratio of powdered crystalline sorbitol to molten sorbitol to be used in the process may be as low as about 1.3. If the ratio is below about 1.3, the matrix temperature becomes difficult to control and there is a tendency for some of the crystalline feed to melt. For example, at a ratio of 0.97 the product contains an excessive amount of molten sorbitol and requires a long period of standing before hardening takes place. In practice, it is preferred to select a ratio of from about 2 to about 5 since it is found that precise control of temperature is readily achieved, glass formation is avoided and high degree of throughput is possible.

As has been mentioned, it is critical in the formation, agitation and subsequent cooling of the matrix, that "glass" formation be substantially prevented since the presence of even a small amount of glass extends greatly the time required to produce particles hard enough to be millable and free-flowing. Glass formation occurs when, during the formation of the matrix, the granular sorbitol which is initially present is allowed to melt and, being no longer in a crystalline state, is dispersed as a liquid in the matrix. There is also a tendency for glass formation to occur when insufficient seed crystals are present, e.g., when the recycle ratio is below about 1.3 parts of crystalline sorbitol per part of molten sorbitol. It has been found that, at the desirable rapid rate of matrix formation, glass formation is precluded most readily in an embodiment of the instant invention comprising a mixing device providing sufficient shear and impact on the materials to disperse and bring the molten sorbitol very rapidly into intimate contact with the relatively large crystal surface area provided by the crystalline sorbitol. Such an embodiment accelerates greatly the rate of crystallization of sorbitol from the molten state and substantially precludes the transformation of crystalline sorbitol into the slowly crystallizing glassy state. This rapid mixing with concomitant shearing and impact helps maintain the matrix, once formed, in a particulate state and it is in this particulate state that the rapid crystallization of the molten sorbitol initially introduced occurs. This crystallization of the molten sorbitol which so rapidly is begun at the time of contact of the melt with the crystalline granules is substantially complete by the time the particulate matrix has cooled from its mixing temperature to about 40° C. The mixing temperature may vary from about 45° C. to about 95° C., depending directly on the temperature of the molten feed and inversely on the feed ratio and being higher at low ratios of powdered crystalline sorbitol to molten sorbitol in the feed. At the 2–5 ratios most conveniently employed, as mentioned hereinbefore, the mixing temperature is about 70 to 75° C.

Figure 2:
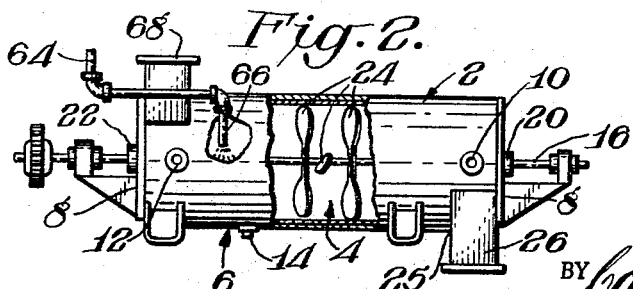

The process is carried out in a continuous manner by withdrawing crystalline sorbitol from the system as produced at a rate equal to that at which molten sorbitol is introduced and by recycling a portion of the total crystalline sorbitol discharged from the system so that the desired ratio of crystalline sorbitol to molten sorbitol is maintained at the feed end of the mixer. This process will be more clearly understood by the reference to the drawing in which:

FIG. 1 diagrammatically shows an apparatus suitable for performing the invention, and FIG. 2 is a side view partially in section of the apparatus in which matrix formation takes place.

Referring to the figures, 2 designates generally an elongated cylindrical jacketed high speed mixer including cylindrical inside shell 4 and outside shell 6 and fitted with removable end plates 8. A port 10 is provided for introduction of heat exchange fluid to the jacket formed by shells 4 and 6; a port 12 is provided for exit of said fluid. A port 14 provides for drainage of said jacket.

Shaft 16 extends longitudinally through mixer 2, is journaled in bearings 20 and 22 and is provided with paddles along its length. The paddles generally designated 24 are adjustable in pitch and are so adjusted as to provide both a mixing and a propulsive action (from left to right in the apparatus shown in FIGURE 1). Shaft 16 may be driven by any suitable means (not shown).

Crystallized sorbitol granules are discharged from mixer 2 into duct 26 and pass through rotary vane feeder 27, driven by any suitable means, into the dryer-cooler generally designated 28. The dryer comprises a cylindrical shell 30 containing annular shelves 32 vertically arranged and suitably connected with one another and through drive gears 34 to a driving means 35 so that they rotate slowly and in common. Shelves 32 are individual trays with gaps through which the crystalline sorbitol is swept by arms 36 after each rotation in the dryer. Shaft 38 is journaled in bearings 40 and 42 and is provided with fans along its length. The fans generally designated 44 are mounted within the open core of annular shelves or trays 32 and provide an air flow across each tray. Shaft 38 may be driven by driving means 35 through drive gear 34.

The dryer-cooler is divided into two sections by circular plate 45 and passage of the warm dry crystalline sorbitol from the upper, hot section into the lower, cool section is by means of rotary valve 47 which may be driven by any suitable means.

The upper section of dryer 28 is provided with air inlets, designated generally 60 through which is blown by means of blower 61 air heated by steam heater 63. The warm air is directed over annular trays 32 by the motion of fans 44 and then is directed to exit pipe 62 from which it is discharged.

The lower section of dryer 28 is provided with air inlets designated generally 65 through which is blown by means of blower 67 air cooled by cooling unit 69. The cool air is directed over annular trays 32 by the motion of fans 44 and then is directed to exit pipes designated generally 71 from which it is discharged.

Conveyor 46 elevates the crystalline sorbitol discharged from dryer-cooler 28, from discharge port 31 through rotary vane feeder 48 into the base of said conveyor up to classifying hopper 50 which contains screens generally designated 52 and in which the crystalline sorbitol is separated into granules and powder. Granules of a size suitable for end-use or sale are discharged through duct 3 into granular storage bin 5. Powder is sent through duct 54 to feeder hopper 56. Particles which are larger than the cut sent to granular storage bin 5 are passed into duct 7 and particles which are smaller than the cut sent to bin 5 are passed into duct 9 and the combined contents of ducts 7 and 9 are passed into hammer mill 11, driven by any suitable means, and the milled crystalline sorbitol is discharged into duct 13 through which it is returned to feeder hopper 56. The ratio of material withdrawn (overflow to bin 17) to material recycled is determined by the rate at which screw 23 is rotated in feeder 29. Material to be withdrawn (overflow) from the feeder hopper is returned through duct 15 to powder bin 17 where it is held for end-use or sale. The contents of bins 5 and 17 may be withdrawn to bin 19 for blending to desired average particle size distribution and crystalline sorbitol is withdrawn from bin 19 through port 21 for the desired end-use or sale.

Port 66, through which molten sorbitol is introduced into mixer 2 is disposed slightly downstream from the point at which granular sorbitol enters at port 68, molten sorbitol is conducted to inlet port 66 through pipe 64 from a source not shown.

In operation, mixer 2 is filled with granular sorbitol from feeder 29 while shaft 16 is turning and is rapidly propelled by paddles 24 toward the exit port 25. At the same time, molten sorbitol is forced into the mixer through port 66.

The granular matrix which is formed by intimate mixing in the apparatus passes out of exit port 25 and is fed via duct 26 through feeder 27 to the upper section of dryer-cooler 28. The crystalline sorbitol is deposited on the uppermost tray 32 and after one complete revolution of said uppermost tray is pushed by uppermost stationary knife 36, through a slot in said tray to the tray immediately below, where the procedure is repeated at each revolution until the granular sorbitol reaches the lower part of the upper section of dryer-cooler 28. It is then transferred into the lower section of the dryer-cooler by means of rotary valve 45 whereupon its movement through the lower section is repeated substantially as described for the upper.

The crystalline sorbitol leaves the dryer-cooler through exit port 31 and is fed by feeder 48 into the base of conveyer 46 where it is elevated to hopper 50. In the hopper powdered crystalline sorbitol which passes all three screens 52 is transferred to feeder hopper 56 through duct 54. The fraction suitable for end-use or sale is held by the middle screen and is passed off through duct 3 to storage bin 5. Granular sorbitol over and under the size in bin 5 is retained by the first and third screens and is passed into hammer mill 11 through ducts 7 and 9, respectively. The milled, crystalline sorbitol discharged into duct 13 is passed into feeder hopper 56. Sorbitol in excess of that required to maintain the desired recycle ratio leaves the feeder hopper as "overflow" through duct 15 and passes into bin 17 where it is held for end-use or resale.

In continuous operation at a preselected net production rate, feeder screw 23 is rotated at a rate to supply crystalline sorbitol to the mixer in the amount required to establish the desired ratio of crystalline sorbitol to molten sorbitol. Under these conditions of operation, the total of the powder "overflow" through duct 15 and the granular cut removed through duct 3 represents the amount of crystalline sorbitol exiting from the system and is equal to the preselected net production rate.

The embodiment of the process as outlined readily provides for the continuous mixing of molten sorbitol (which may contain up to about 5% by weight of moisture) with crystalline sorbitol in a ratio of one part of molten sorbitol to at least about 1.3 parts of said crystalline sorbitol. The mixing must be carried out in such a manner that there is provided sufficient shear and impact on the materials to disperse and bring the molten sorbitol into intimate contact with the surface area provided by the crystalline sorbitol, thus providing for the facile production of the particulate matrix and the concomitant greatly accelerated crystallization of the molten sorbitol entering while precluding the formation of solid sorbitol in the vitreous or glassy state. In the said vitreous state, as mentioned hereinbefore, the solidification rate is greatly retarded. While it is not an express embodiment and limitation of the instant invention, a commercially-available processing machine which may be employed in this step of the invention is the Turbulizer manufactured by the Strong-Scott Manufacturing Co., Minneapolis, Minn.

With respect to cooling the matrix, during which step the molten sorbitol crystallizes, it is to be understood that cooling in this sense is a relative term. While it contemplates cooling to ordinary room temperature, the term cooling used herein is equally applicable to reducing the temperature of the mixture to any point below the melting point of molten sorbitol. Thus, it is found to be particularly convenient, in view of the extremely rapid rate of crystallization, to operate the drying section of the apparatus at from about 65° C. to about 75° C. to provide for rapid removal of any water remaining in the matrix after it leaves the mixer. It is convenient for most rapid production of crystalline sorbitol to operate the cooling section of the dryer-cooler at from about 30° C. to about 40° C.

The particle size of the product emerging from the mixer is determined by several factors including the speed at which the mixer is agitated, the temperature in the matrix and the ratio of solid to melt being charged. It is found, for example, that if the ratio of solid to liquid being charged decreases, the particle size tends to increase. In the preferred ratio of from about 2 to about 5 parts of solid, however, the size distribution of the product typically is as follows:

| Sieve No.:[1] | Percent on screen[2] |
|---|---|
| 10 | 45 |
| 20 | 39 |
| 30 | 9 |
| 40 | 3 |
| 50 | 0 |
| 60 | 2 |
| 80 | 1 |
| 100 | Trace |
| Through 100 | [3] 1 |

[1] U.S. Bu. Standards, Standard Screen Series, 1919.
[2] Percentage of total amount of material remaining on testing sieve.
[3] Percentage of total amount of material passing through No. 100 sieve.

From these data it is indicated that 84% of the product consists of particles which will not pass a 20 mesh screen. The particles, therefore, have a diameter of *at least* 0.0331 inch.

While the particles with this size distribution range can be used for recycle to the mixer, it is preferred to grind them to a smaller size before they are mixed with fresh molten sorbitol. While the reason is not clearly understood, it appears that the much increased surface area available in the ground product increases the rate at which crystallization occurs and allows very short, i.e., of the order of 2–5 seconds, residence time in the mixer. It is therefore preferred to grind and classify the product before it is recycled. This may be done by means of a mill and suitable screens and a typical size distribution preferred for the recycled crystalline sorbitol is as follows:

| Sieve No.: | Percent on screen |
|---|---|
| 10 | ---- |
| 20 | ---- |
| 30 | Trace |
| 40 | 3 |
| 50 | 5 |
| 60 | 4 |
| 80 | 8 |
| 100 | 39 |
| Through 100 | 41 |

Thus, it is preferred, for most efficient operation, to charge a powder, 80% of which consists of particles which pass an 80 mesh screen. These particles, therefore, have a diameter which does not exceed 0.0070 inch.

From the foregoing, it is clear that 84% of the matrix particles, having a diameter of at least 0.0331 inch, have at least 4.7× the diameter of 80% of the feed particles, which have a diameter of at least 0.0070 inch. Discounting for the moment the material introduced in the form of a melt, this result would require 4.7×4.7×4.7, or about 104, charged particles to produce one product matrix particle. However, since as has been described hereinbefore, the process may be carried out in the range of from about 1.3 to about 10 (or more) parts of solid sorbitol per part of molten sorbitol, from amount 57% to at least about 91% of the charge consists of solid sorbitol and from about 58 to at least about 92 particles of charged crystalline sorbitol end up in each particle of granular matrix. From these data it is obvious that particles are not being simply coated with molten sorbitol but that they are being bound together, i.e., cemented, into matrix. Thus it is clear, in distinction to the process of U.S. Patent 2,594,863 which recites that the process must be carried out without matrix formation, that matrix formation must be regarded as an inherent and critical characteristic of the process of the instant invention.

The following example discloses a specific embodiment of the present invention but is not to be construed as limiting the invention in any manner.

Example

A sorbitol syrup, obtained by the catalytic hydrogenation of glucose is evaporated to a solids content of approximately 97%, the balance comprising substantially water. This syrup is heated to an initial temperature of 98° C.

A mixer, as described, with an 8 inch diameter shell and 52 paddles is operated at 1500 r.p.m. and is charged with crystalline sorbitol at such a rate that 1000 lbs./hr. of material leaves the mixer. The crystalline sorbitol charged has the following particle size distribution: on 30, trace; on 40, 3%; on 50, 5%; on 60, 4%; on 80, 8%; on 100, 39%; through 100, 41% (U.S. Sieve Series, Bu. Standards). The hot, molten sorbitol is added through the intake port at a rate of 250 lbs./hr. and fresh crystalline sorbitol is fed to the mixer at a rate of 750 lbs./hr. The temperature of the matrix measured at the exit port of the mixer is controlled at 70° C. by minor and suitable adjustments in the temperature of the molten sorbitol.

The particulate matrix, discharged by the mixer, has the following particle size distribution: on 10, 5%; on 20, 39%; on 30, 9%; on 40, 3%; on 50, 0%; on 60, 2%; on 80, 1%; on 100, trace; and through 100, 1%.

The particulate matrix is fed to a dryer, as described, in which the annular trays make one rotation per minute, and air at a temperature of 75° C. is circulated through the dryer. Air at a temperature of 35° C. is circulated through the cooling section. Material leaves the dryer at a rate of 1000 lbs. per hour, is moved up an elevating conveyer and is passed into screening equipment wherein the fraction which passes a 30 mesh screen is separated and a portion of the fraction held on 30 is ground so that all passes through an 80 mesh screen. The ground crystalline sorbitol is recombined with that which passes 30 mesh and 750 lbs./hour is recycled to the mixer while a total of 250 lbs./hour unground material held on the 30 mesh screen and ground material "overflow" from that recycled to the mixer are drawn off and bagged.

What is claimed is:

1. A process for producing particulate solid sorbitol which comprises agitating molten sorbitol containing up to about 5% moisture with between about 1.3 and about 5 parts by weight of granular sorbitol at a temperature from about 45° C. to about 95° C. to obtain a particulate matrix of molten sorbitol containing therein granules of solid sorbitol, said agitation and said temperature being so adjusted that said granular sorbitol remains solid, and continuing said agitation with cooling until the molten sorbitol of the particulate matrix crystallizes.

2. A process as in claim 1 wherein each particle of said particulate martix is comprised of at least fifty granules of solid sorbitol in molten sorbitol.

3. A process as in claim 1 wherein said granular sorbitol is comprised of particles at least 80% of which are passed by a U.S. Bureau of Standards, Standard Screen Series Sieve No. 80.

4. A process as in claim 1 wherein said molten sorbitol is mixed with 3 parts by weight of said granular sorbitol.

5. A process as in claim 1 wherein said temperature is 70° C.

6. A process as in claim 1 wherein said temperature is 70° C., 3 parts by weight of granular sorbitol is used, at least about 75% of which is passed by a U.S. Bureau of Standards, Standard Screen Series Sieve No. 80, and at least about 75% of the sorbitol granules obtained are retained by a U.S. Bureau of Standards, Standard Screen Series Sieve No. 40.

7. A process as in claim 1 wherein said temperature is from about 65 to about 75° C., from about 2 to about 5 parts by weight of granular sorbitol is used, at least about 80% of said granular sorbitol passing a U.S. Bureau of Standards, Standard Screen Series, Sieve No. 80, and at least about 75% of the sorbitol granules obtained are retained by a U.S. Bureau of Standards, Standard Screen Series Sieve No. 40.

8. The process of claim 7 wherein the granular sorbitol is a recycled product.

References Cited
UNITED STATES PATENTS 2,594,863   4/1952   Buck et al. _____ 260—637

LEON ZITVER, *Primary Examiner.*

M. B. ROBERTO, J. E. EVANS, *Assistant Examiners.*